Oct. 5, 1948.  T. A. TE GROTENHUIS  2,450,457
PROCESS AND APPARATUS FOR COAGULATING
A COAGULABLE FLUID

Filed Nov. 9, 1945  2 Sheets-Sheet 1

INVENTOR.
Theodore A. TeGrotenhuis
BY
Evans + McCoy.
ATTORNEYS

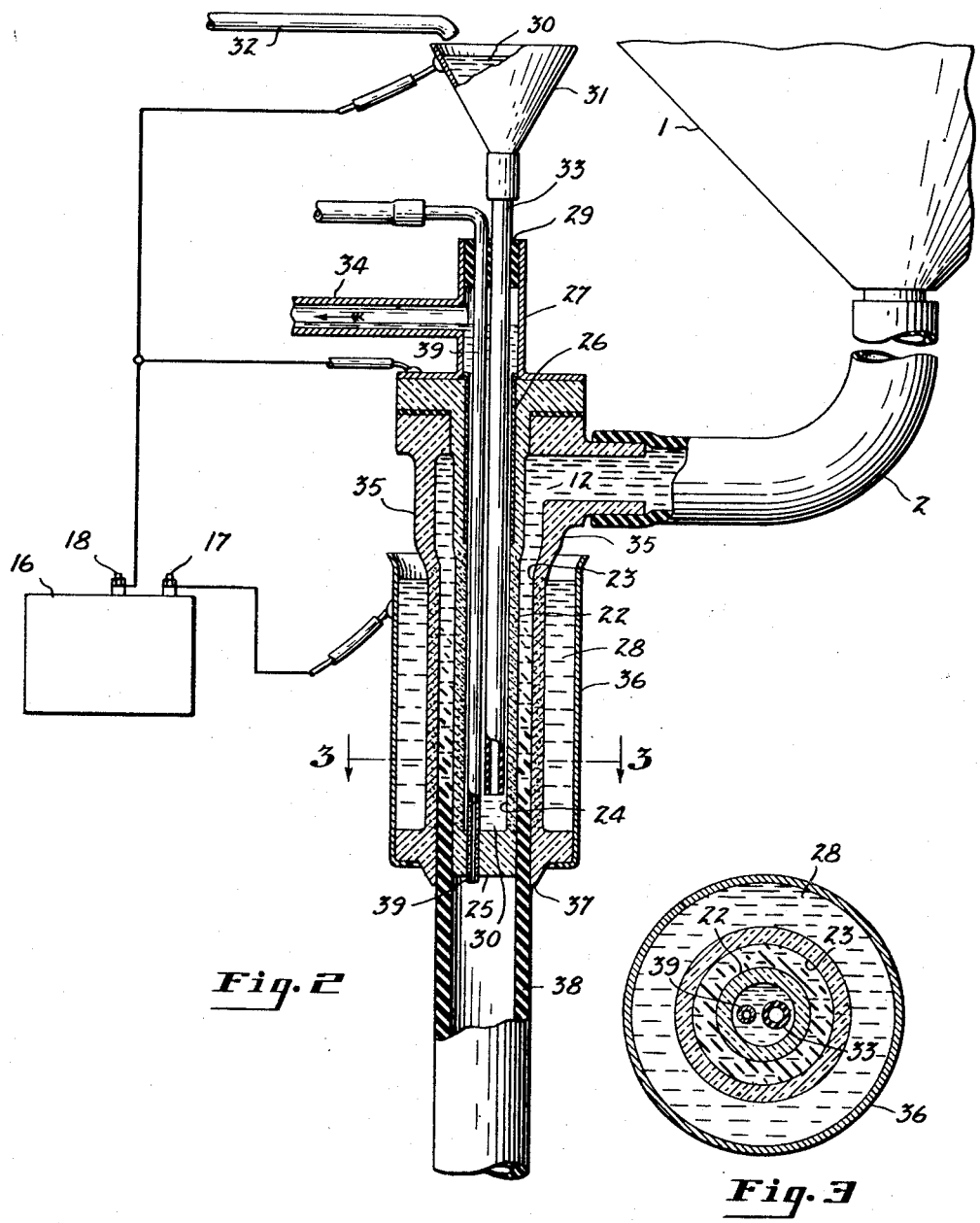

Patented Oct. 5, 1948

2,450,457

UNITED STATES PATENT OFFICE 2,450,457

PROCESS AND APPARATUS FOR COAGULATING A COAGULABLE FLUID

Theodore A. Te Grotenhuis, Olmsted Falls, Ohio, assignor to The General Tire & Rubber Company, Akron, Ohio, a corporation of Ohio Application November 9, 1945, Serial No. 627,646

10 Claims. (Cl. 18—12)

This application is a continuation in part of my copending application Serial No. 439,676 filed April 20, 1942, now Patent No. 2,395,920. This invention relates to a process and apparatus for manufacturing non-porous rubber or plastic products from electrically coagulable fluids such as conductive natural or artificial dispersions or emulsions. It particularly relates to a method of forming tubing, rods, threads and the like from aqueous dispersions of natural or artificial rubbers or resinous materials.

It has been proposed to form products such as rubber tubing, rods, thread or the like by extruding them in desired form from compounded aqueous dispersions of rubber or the like. In accordance with one method the compounded latex is extruded into a liquid coagulating bath from which the coagulated material is removed and dried in desired form. Such a process is subject to the disadvantage that the coagulant may form a relatively thin skin of coagulated rubber over the surfaces of the article leaving a soft interior. The skin has a tendency to prevent drying or coagulation of the interior portions with the result that the article may not be retained in the desired shape. In accordance with another method a heat-sensitized compounded latex is passed slowly through a heated die, which causes gelation or coagulation of the material in the shape of the die as it passes through the die. In such a process the heat must migrate into the interior of the article passing thru the die but the temperature of the heating fluid applied to the surface of the compounded latex in the die must be sufficiently low to prevent vaporization of any of the liquid so as to cause vacuums or voids in the shaped article. In the formation of thick-walled articles, therefore, the heating of the interior of the article is slow and the rate of passage of the material through the die is therefore necessarily very slow.

It has been proposed to accomplish gelation of unfrothed latex in a desired form by passage of electrical current therethrough. When solid electrodes are disposed in direct contact with the conductive latex, electrolysis of the latex causes a substantial quantity of gas to be formed in contact with the latex with the result that porosities in the surface of the finished article or other undesirable effects occur. To eliminate this disadvantage, it has been proposed to make electrical connection to the unfrothed fluid latex as it passes between electrodes by spacing the electrodes from the latex by a non-conductive medium, to form a condenser between each surface of the electrically conductive latex and an electrode adjacent thereto. The current capable of being passed thru the latex is thus limited by the amount that can be passed thru the condensers.

As is well-known, the current capable of passing through any electrical condenser is substantially proportional to the capacity of the condenser, the frequency of the power supply and the voltage impressed. With the relatively low capacities easily obtainable in practice it is seen that a very high frequency or a very high voltage or both must be utilized to obtain sufficient passage of current through the condensers in series with the latex being coagulated. The spacing of the electrodes from each surface of a conductive fluid so as to form two condensers in series with the conductive fluid does permit, however, the passage of an alternating current of any frequency between the electrodes and through the conductive fluid without disadvantages due to electrolysis of the fluid. The fluid as long as it remains electrically conductive is heated by effects of conducted current not by a so-called condenser effect (a change of dielectric stress) as in the case of non-conductive solid rubber.

It is another object of the present invention to provide a method of coagulating in permanent form a coagulable fluid such as an aqueous dispersion of rubber or resinous materials, wherein the article is coagulated by passage therethrough of electrical current of any desired frequency and wherein a lower voltage is used than that heretofore practical to obtain the same continued current flow.

It is another object of the present invention to provide apparatus for making thread, tubing or shaped articles directly from a compounded aqueous dispersion of a rubber or resinous material (including a liquid-resin-forming material).

It is still another object of the present invention to provide apparatus suitable for forming tubing by passage of electrical current through a shaped aqueous dispersion of a rubber or resinous material.

It is a further object to provide a method of continuously rapidly forming rubber tubing from a compounded heat-sensitized rubber latex, wherein alternating current is passed through said tubing to cause by vibration of the particles thereof coagulation in shaped form without the disadvantages due to gases of electrolysis being involved on the surfaces of the electrodes.

The generation of high frequency power is expensive even starting with low frequency alternating current, there is about a 50% loss. When this loss together with the cost and upkeep of the apparatus is considered, it is seen that the cost of heating by passage of high frequency current through an object is considerably greater than that of heating by passage of low frequency current through an object.

It is an object of the present invention to provide a method of coagulating solid articles from natural or artificial dispersions of rubber or resinous materials, wherein a relatively low frequency current may be passed through the latex while it is retained in shaped form to coagulate it in its entirety without use of exceedingly high and dangerous voltages and without any deleterious effects due to gases generated by electrolysis.

Other objects will be apparent from the following description of the invention as illustrated by the accompanying drawings, in which:

Fig. 2 is an elevational view, partly in section, of suitable apparatus embodying the present invention for forming rubber or resinous tubing; and Fig. 3 is a sectional view on the line 3—3 of Fig. 2.

Figure 1:
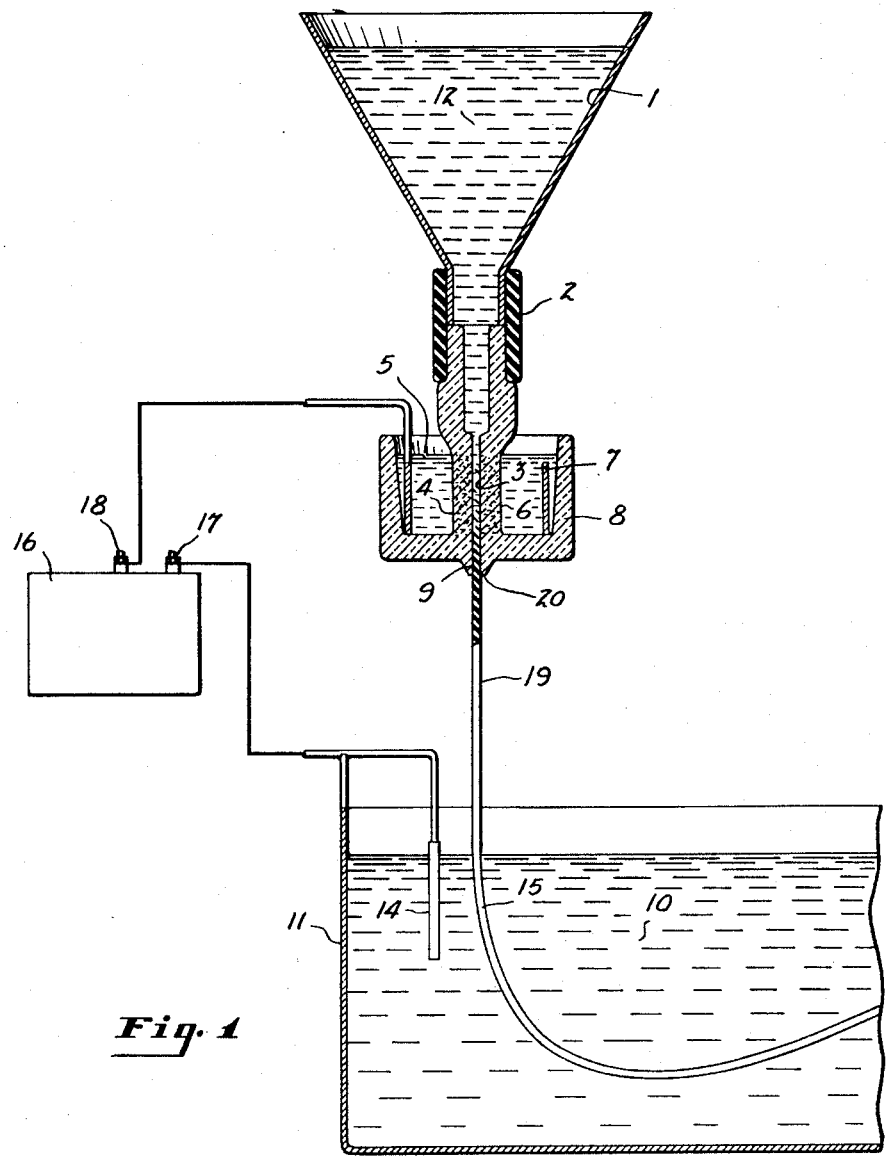
Figure 1 is an elevational view, partly in section and partly in diagrammatic form, of apparatus suitable for forming thread or rods from a heat or vibration-sensitized aqueous dispersion of rubber or resinous materials.

In accordance with the present invention, an unfrothed coagulable fluid such for example as an aqueous dispersion of rubber compounded so as to be unstable and coagulate at elevated temperatures (below the boiling point of the main volatile ingredients thereof) is passed through a shaping zone or chamber which may be a suitable die to form a fluid stream of the desired shape. An electrical connection is made with the coagulable fluid in the die or shaping zone through an electrolytic conductor or porous material containing a liquid electrolyte or solution of electrolyte such for example as a solution of an acid base or salt. The electrolytic conductor or conductors are preferably so disposed that the electrical current is passed relatively uniformly through the shaped stream of coagulable fluid within the shaping zone to coagulate the fluid in shaped form by electrophoretic vibrations as evidenced by the elevated temperature due to current passage. The electrolyte in contact with the coagulable liquid is maintained within a porous material to prevent intermingling of the coagulable liquid with the electrolyte solution, and to thus cause said coagulable fluid to be retained in the form desired until coagulation is had. In case the object being formed is a rod or thread one of the spaced electrolytic conductors may be a bath into which the gelled coagulated thread or rod is fed. Another electrolytic conductor being a porous material containing electrolyte and making contact with the uncoagulated latex. Electric current is then passed between the electrodes in series through the spaced solutions of electrolyte which are respectively in contact with spaced surfaces of said latex material and through the latex to cause coagulation by heat or by electrophoretical movement of the particles.

In view of the fact that the coagulum from an unfrothed latex or aqueous dispersion is not appreciably conductive, the electrolytic conductors are preferably so disposed that at least a portion of each contacts the uncoagulated aqueous dispersion, or a conductive liquid not separated from the uncoagulated fluid by non-conductive coagulum. Conduction longitudinally over a coagulated portion of a thread or a rod may be accomplished through the film of aqueous liquid that separates out on the surface upon coagulation.

Referring more particularly to the drawings, in which like parts are designated by like numerals of reference throughout the several views, the unfrothed conductive coagulable fluid, such as a suitable compounded rubber latex or aqueous dispersion of a resin (including the resin-forming materials which are formed by heat etc. into a resin) is dispersed in a suitable storage portion or container 1 and is fed by means of pressure which may be a static head through a suitable conduit portion 2 into a forming or shaping chamber.

In the modification shown in Fig. 1, which illustrates the making of solid threads or rods by the method of the present invention, the coagulable fluid which may be an aqueous dispersion preferably compounded as well known in the art so as to gel by the influence of heat or electrophoretic action, is conducted under a suitable pressure head from the container 1 thru the conduit portion 2 to the die or tubular shaping chamber where it is formed into a stream of the shape or cross section desired. The forming chamber of the die is defined by the inner cylindrical surface 3 of the electrolytic conductor 4 which is a completely porous material, such for example as unglazed porcelain, a microporous rubber etc., containing a solution of electrolyte within the pores thereof.

Means such as a bath of electrolyte 5 is provided in contact with the outer unglazed porous surface 6 for making contact with the outer annular electrode 7, which may be of carbon or of metal. The annular electrode 7 is concentric with the center of the die or shaping chamber defined by the unglazed surface 3 and is spaced from the outer unglazed surface 6 to permit evolution of gases evolved upon electrolysis. The bath of electrolyte 5 which is preferably a salt such as an alkali metal carbonate, acetate or sulfate so as to prevent obnoxious gases upon electrolysis may be carried by any suitable means, such as the non-porous cup-shaped portion 8, which may be integral with the unglazed porous portion 4 of the electrolytic conductor. The unglazed porous surfaces 3 and 6 may be coextensive with the height of the electrode 7 or with the height of the fluid 5, so that a substantial area of contact may be had between the fluid latex 9 within the shaping chamber. When the electrolyte of the electrolytic conductors is itself a chemical coagulant for the coagulable fluid it may be desirable to shorten the length of the unglazed surface of the die to prevent complete coagulation within the die. The latex may pass by gravity or suitable force from the shaping chamber 9 through a suitable immiscible fluid (usually air), into the conductive liquid 10 within the tank 11. When the tank 11 is formed of carbon or metal, it may serve as the other necessary electrode for connection to the current source. However, an electrode 14, such as a strip of carbon, immersed within the liquid 10 is preferably utilized. The electrode 14 may be spaced relatively near the coagulated or gelled portion 15 of the stream.

In the making of threads utilizing the apparatus shown in Figure 1, connection is made between a suitable source 16 of electrical energy, preferably a source of alternating current of any desired frequency. Thus the terminals 17 and 18 may be connected to the spaced electrodes 7 and 14, which respectively contact the conductive aqueous solutions 5 and 10, which may be solutions of electrolyte. Current is passed from the source between the electrodes 7 and 14, through portions of the electrolyte in contact therewith into and through the shaped stream 19 of coagulable fluid which is above the surface of the liquid 10 and below the surface of the liquid 5. The voltage applied between the electrodes 7 and 14 is preferably such that the aqueous dispersion is just converted into a gel when the surface of the liquid 10 is reached. The current passed through the liquid latex should not be sufficient to heat the volatile ingredients to such a degree that spongy or porous material is obtained due to vaporization. The space between the exit end of the die or shaping chamber 20 and the surface of the liquid 10 may be varied so that coagulation occurs at or just prior to contact with the liquid 10.

Referring particularly to the modification shown in Fig. 2, the unfrothed coagulable fluid such as a heat sensitized latex or an aqueous dispersion of resinous material is passed from the conduit portion 2 into the annular space between the inner electrolytic conductor 22 and the outer electrolytic conductor 23. Each of the conductors 22 and 23 comprises a permeable porous material, such as unglazed porcelain, microporous rubber, etc., and contained conductive liquid, such as a solution of an electrolyte. The inner electrolytic conductor 22 is a portion of the inner element of the stream shaping die or shaping chamber. The inner element comprises a chamber filled with conductive liquid 30, which chamber is defined by the wall 24 which may be of porcelain and which is unglazed, for a distance equal to the height of the liquid 28, a solid electrode consisting of a carbon sleeve 26 in contact with the liquid 30 and a cap 27 in electrical contact therewith, and the stopper 29.

Means is provided for feeding liquids 30, such as a solution of electrolyte, into the cavity within the central element. Such means may comprise a container 31 which is maintained full of liquid supplied from the pipe 32 and the non-conductive conduit 33, which passes through the stopper 29 into the lower region of the cavity, as shown in Fig. 2. The solution of electrolyte from the cavity of the central element flows past and in electrical contact with the carbon sleeve 26 which serves as one solid electrode of the tube forming apparatus and from which gaseous bubbles due to electrolysis are thereby removed out of the exit conduit 34.

The outer element of the forming chamber comprises the electrolytic conductor 23 which may consist of porous porcelain or the like and contained solution of electrolyte, means such as the wall portion 35 for holding the outer electrolytic conductor concentric with the inner die element, means such as the bath of electrolyte 28 for replenishing electrolyte within the porous material of the electrolytic conductor 23, and means such as the annular solid electrode 36 for making contact with the bath 28. The outer electrolytic conductor 23 and the outer electrode 36 are concentric with the inner electrolytic conductor 22.

In the production of tubing by the use of apparatus illustrated in Fig. 2, the ungelled latex or other coagulable fluid 12 is fed under suitable pressure from the conduit 2 slowly between the electrolytic conductors 22 and 23 where it is formed into a stream of tubular shape. The path of current flow from the terminal 17 is to the electrode 36 through the bath of electrolyte 28, the electrolyte maintained within the electrolytic conductor 22, thru that portion of the tubular shaped stream of aqueous latex or other dispersion which is in the ungelled state, to the solution of electrolyte within the inner electrolytic conductor 23, the electrolyte 30 within the cavity of the central element of the die or forming member, to the carbon sleeve 26 and thence to the other terminal 18 of the source 16.

The power input through the aqueous dispersion between the electrolytic conductors is regulated by increasing or reducing the voltage so that gelation takes place before the latex proceeds beyond the end 37 of the forming die so that a tube 38 is produced from the gelled or coagulated material.

To prevent collapse of the tube 38, an air vent through the non-conductive tube 38 may be provided through the end 25 of the inner shaping element, through the electrolytic field cavity therein and the stopper 29 to a source of atmospheric air, or air under very slight pressure (not shown).

The source 16 is preferably a source of alternating current which may be of any desired frequency from 0 to say 100,000,000 cycles per second. Direct current (alternating current of zero frequency) is not as desirable as current of higher frequency for the reason that there may be a slight tendency for migration of sufficient latex particles to cause plugging of the porous material of the electrolytic conductors before coagulation takes place. Also when the frequency is 50 or 60 cycles per second or more the electrophoretical vibration of the particle becomes a main effect in inducing coagulation.

Since direct contact is made between the current source and spaced surfaces of the latex, it is seen that a very much lower voltage need be used to obtain current flow than in the case where electrodes are simply spaced from the surface of the latex by air or other non-conductive medium. Gases due to electrolysis are evolved upon the inner surface of the electrode 36 in contact with the electrolyte 28 and upon the surface of the carbon sleeve 26. There is no point where any gases are formed by electrolysis in contact with the coagulated or coagulable fluid.

While natural rubber latex compounded in accordance with principles recognized in the art is preferred as the coagulable aqueous dispersion passed from the source 1 to the conduit 2, other coagulable aqueous dispersions may be utilized. Examples of such dispersions are: aqueous dispersions of natural or synthetic rubbers including the sulfur-vulcanizable and other vulcanizable rubbers; dispersions of thermoplastic or thermosetting solids; and dispersions or emulsions of resin-forming materials such for example as the raw materials or partially reacted raw materials used for production of phenol aldehyde, amine aldehyde or hydrocarbon resins, which raw materials are capable of being formed by heat into a coherent solid mass.

Since the heat is formed in situ in the interior of the tube or thread, the stream may be passed at a much greater rate through the shaping dies when utilizing the present invention than when utilizing external conduction. Heating in accordance with the present invention may be electrical combined with external conduction if the liquid 28 is not cooled. By utilizing substantial fluid flow within the cavity of the inner member, it may be retained at a lower or cold temperature compared to the liquid 28. Since in the formation of tubing the cross sectional area is slightly less adjacent the inner conductor than adjacent the outer concentric conductor, the external heat superimposed acts to provide a more uniform rate of gelation throughout the tube. If desired the current may also be passed longitudinally of the tubular stream as in Fig. 1.

It is to be understood that variations and modifications of the specific process and product herein shown and described for purposes of illustration may be made without departing from the spirit of the invention.

What I claim is:

1. A process of coagulating an unfrothed coagulable fluid into permanent form, comprising forming the fluid into a fluid stream of the approximate shape desired in the article to be formed, contacting a shaped portion of said stream with a porous material containing a conductive fluid therein, causing said stream to flow relative to said porous material, and while said stream of fluid is flowing passing an electric current in series through said conductive fluid and said coagulable fluid to cause said coagulable fluid to coagulate in the shape of said stream whereby gases due to electrolysis are not evolved in contact with said coagulable fluid to cause deformation in the surface thereof.

2. A method of coagulating an unfrothed coagulable fluid into a permanent form, comprising passing said fluid into a shaping chamber of the desired form, contacting said fluid with spaced electrolytic conductors, causing said stream to move relative to said conductors, and passing a current in series through the electrolyte of said conductors and through said coagulable fluid in said shaping chamber to cause said fluid to retain the general shape of said shaping chamber, whereby gases generated by electrolysis are not evolved in contact with said coagulable fluid.

3. A method of forming a rod or thread from an unfrothed, heat-coagulable aqueous dispersion of a member of the group consisting of rubber, thermoplastic resins and resin-forming materials, which comprises forming a stream of said unfrothed, heat-coagulable aqueous dispersion, contacting said stream at one point with an electrolyte in an electrolytic conductor, and contacting said stream at a point spaced along the path from said first point with conductive liquid, and while said stream is flowing relative to said conductor passing a current in series through said electrolyte, said stream and said conductive liquid to cause gelation of said aqueous dispersion in substantially the shape of said stream without causing gases of electrolysis to be formed in contact with said aqueous dispersion.

4. The method of claim 3 wherein the aqueous dispersion is a suitably compounded rubber latex.

5. A method of making tubing from an unfrothed, heat-coagulable fluid, which comprises passing said fluid suitably compounded into an annular space between substantially concentric electrolytic conductors, contacting said fluid with the electrolyte of said electrolytic conductors, causing flow of said fluid relative to said conductors, and while said fluid is moving relative to said conductors passing a current through said fluid and in series through the electrolyte of said conductors to cause said fluid to be gelled in tubular shape, solid electrodes making electrical contact with said coagulable fluid only through said electrolyte of said conductors, whereby gases deposited upon said electrodes by electrolysis are formed out of contact with said fluid.

6. Apparatus for making tubing which comprises an outer forming member with an inner tubular surface, an inner forming member with an outer generally cylindrical surface disposed substantially concentric with said inner surface of said outer member and spaced therefrom to provide an annular shaping chamber, a passageway for conducting coagulable fluid into one end portion of said annular shaping chamber and an annular opening to permit exit of gel in tubular form from another end portion of said annular shaping chamber, said inner member containing a cavity and being provided with means for supplying a fluid electrolyte to said cavity and having an annular porous portion for retaining the electrolyte in position to make electrical contact with said coagulable fluid while retained in tubular form, said outer member having a porous wall portion adapted to receive fluid electrolyte therein so that said electrolyte is maintained in annular contact with an outer portion of said coagulable fluid, and electrode means for making contact with the electrolyte solution of said inner and said outer members.

7. Apparatus for gelling a fluid stream of a coagulable fluid permanently into a desired shape, comprising an annular porous wall of nonconductive material containing a solution of electrolyte and adapted to contact said fluid stream and retain it in desired shape, means for continuously moving said stream in contact with said wall, means for making electrical connection with the electrolyte within said wall, connecting means spaced along the path of said stream from said wall for making a second electrical connection with said coagulable fluid, and means for passing a current between said wall and said connecting means along the path of said coagulable fluid.

8. Apparatus for gelling a fluid stream of heat-coagulable, electrically conductive fluid into a desired shape, comprising a porous wall of nonconductive material containing a solution of an electrolyte, means for forming a fluid stream of said coagulable fluid and for causing said fluid to flow relative to and bearing against said wall to make contact with the electrolyte in said wall, means for making electrical connection with the electrolyte in said wall, connecting means spaced along said stream in said wall for making electrical connection with said stream, and means for passing an electric current between said connecting means and said wall.

9. Apparatus for coagulating a fluid stream of heat-sensitive coagulable fluid into a desired shape, comprising a shaping chamber having a porous wall portion of nonconductive material, a solution of electrolye within the pores of said porous wall portion, means for forming a fluid stream of said coagulable fluid, for conducting said stream in contact with said porous wall portion and for continuously causing movement of said stream relative to said porous wall portion, electrolytic connecting means for making an electrical connection with said stream at a point spaced from said wall portion, and means for passing an electric current through said stream between said electrolytic connecting means and said electrolyte in said porous wall portion.

10. Apparatus for making tubing which comprises an outer forming member with an inner tubular surface, an inner forming member with an outer, generally cylindrical surface disposed substantially concentric with said inner surface of said outer member and spaced therefrom to provide an annular shaping chamber, a passageway for conducting coagulable fluid into one end portion of said annular shaping chamber and an annular opening to permit exit of gel in tubular form from another end portion of said annular shaping chamber, said inner member being conductive, said outer member having a porous, non-conductive wall portion adapted to receive fluid electrolyte therein so that said electrolyte is maintained in annular contact with an outer portion of said coagulable fluid, electrode means for making electrical connection with said inner member, and means for making electrical connection with the electrolytic solution of said outer member so that current may be passed between said inner and outer members through the coagulable fluid in said shaping chamber.

THEODORE A. TE GROTENHUIS.

REFERENCES CITED

The following references are of record in the file of this patent:

UNITED STATES PATENTS

| Number | Name | Date |
|---|---|---|
| 2,261,847 | Dufour et al. | Nov. 4, 1941 |
| 2,395,920 | Te Grotenhuis | Mar. 5, 1946 |

FOREIGN PATENTS

| Number | Country | Date |
|---|---|---|
| 477,911 | Great Britain | Jan. 10, 1939 |